(12) United States Patent
Zatloukal et al.

(10) Patent No.: US 7,711,391 B2
(45) Date of Patent: May 4, 2010

(54) MULTIPLE PROCESSOR COMMUNICATION CIRCUIT CARDS AND COMMUNICATION DEVICES THAT EMPLOY SUCH CARDS

(75) Inventors: Peter Zatloukal, Kirkland, WA (US); G. Eric Engstrom, Kirkland, WA (US); Paul R. Nash, Bellevue, WA (US)

(73) Assignee: Varia Holdings LLC, Brooklyn, NY (US)

( * ) Notice: Subject to any disclaimer, the term of this patent is extended or adjusted under 35 U.S.C. 154(b) by 449 days.

(21) Appl. No.: 11/193,287

(22) Filed: Jul. 29, 2005

(65) Prior Publication Data

US 2007/0026894 A1 Feb. 1, 2007

(51) Int. Cl.
*H04B 1/38* (2006.01)
(52) U.S. Cl. .................. 455/558; 455/407; 235/492
(58) Field of Classification Search ............... 455/558, 455/407; 711/122
See application file for complete search history.

(56) References Cited

U.S. PATENT DOCUMENTS

| | | | | |
|---|---|---|---|---|
| 4,280,121 A * | 7/1981 | Crask | | 341/23 |
| 5,091,931 A * | 2/1992 | Milewski | | 379/100.13 |
| 5,343,512 A * | 8/1994 | Wang et al. | | 455/410 |
| 5,559,794 A * | 9/1996 | Willis et al. | | 370/463 |
| 5,764,738 A * | 6/1998 | Gillon et al. | | 379/100.11 |
| 5,925,092 A * | 7/1999 | Swan et al. | | 701/226 |
| 6,381,239 B1 * | 4/2002 | Atkinson et al. | | 370/362 |
| 6,411,617 B1 * | 6/2002 | Kilkki et al. | | 370/353 |
| 6,486,967 B1 * | 11/2002 | Hartman | | 358/1.15 |
| 6,498,792 B1 * | 12/2002 | Johnson et al. | | 370/388 |
| 6,633,745 B1 * | 10/2003 | Bethscheider | | 455/12.1 |
| 6,708,029 B2 * | 3/2004 | Wesel | | 455/428 |
| 6,759,922 B2 * | 7/2004 | Adar et al. | | 333/109 |
| 6,811,653 B2 * | 11/2004 | Huang | | 162/158 |
| 6,868,316 B1 * | 3/2005 | Stevens | | 701/13 |
| 6,894,801 B2 * | 5/2005 | Hartman | | 358/1.15 |
| 6,906,596 B2 * | 6/2005 | Kitamura et al. | | 331/36 C |
| 6,957,133 B1 * | 10/2005 | Hunt et al. | | 701/29 |
| 6,993,320 B1 * | 1/2006 | Brune et al. | | 455/406 |
| 7,003,306 B2 * | 2/2006 | Henry-Labordere | | 455/466 |
| 7,142,882 B2 * | 11/2006 | Schmidt | | 455/552.1 |
| 7,163,155 B2 * | 1/2007 | Briancon et al. | | 235/492 |
| 7,245,589 B2 * | 7/2007 | Neulist et al. | | 370/254 |
| 7,260,378 B2 * | 8/2007 | Holland et al. | | 455/404.2 |
| 7,286,852 B2 * | 10/2007 | Imura | | 455/558 |
| 7,291,018 B2 * | 11/2007 | Nishizawa et al. | | 439/60 |
| 7,303,137 B2 * | 12/2007 | Ho | | 235/492 |
| 7,324,056 B2 * | 1/2008 | Wesel | | 343/766 |
| 7,367,503 B2 * | 5/2008 | Harai et al. | | 235/441 |
| 7,369,528 B2 * | 5/2008 | Tian | | 370/335 |

(Continued)

OTHER PUBLICATIONS

PCT/US06/027417 Written Opinion of International Searching Authority dated Mar. 6, 2007.

*Primary Examiner*—Duc Nguyen
*Assistant Examiner*—Hai V Nguyen
(74) *Attorney, Agent, or Firm*—Schwabe, Williamson & Wyatt P.C.

(57) ABSTRACT

Multiprocessor circuit cards and communication devices that employ such cards are described herein. In some instances, the multiprocessor circuit cards may be subscriber identity module (SIM) cards and the communication devices may be wireless mobile telephones that are compliant with a communication standard such as ISO/IEC, 3GPP, GSM consortium or other standards.

32 Claims, 3 Drawing Sheets

U.S. PATENT DOCUMENTS

| | | | |
|---|---|---|---|
| 7,418,252 B2* | 8/2008 | Erskine et al. | 455/405 |
| 7,426,599 B2* | 9/2008 | Yancey et al. | 710/312 |
| 7,435,483 B2* | 10/2008 | Lee et al. | 428/481 |
| 7,444,454 B2* | 10/2008 | Yancey et al. | 710/312 |
| 7,450,963 B2* | 11/2008 | Krishnan et al. | 455/557 |
| 7,496,344 B2* | 2/2009 | Stadelmann et al. | 455/406 |
| 2002/0073282 A1 | 6/2002 | Chauvel et al. | |
| 2002/0128037 A1* | 9/2002 | Schmidt | 455/553 |
| 2003/0002079 A1* | 1/2003 | Hartman | 358/1.15 |
| 2003/0036394 A1* | 2/2003 | Henry-Labordere | 455/466 |
| 2003/0144003 A1* | 7/2003 | Ranta et al. | 455/450 |
| 2004/0089717 A1* | 5/2004 | Harari et al. | 235/441 |
| 2004/0127256 A1* | 7/2004 | Goldthwaite et al. | 455/558 |
| 2004/0164170 A1* | 8/2004 | Krygier et al. | 235/492 |
| 2005/0048947 A1* | 3/2005 | Holland et al. | 455/404.1 |
| 2005/0256969 A1* | 11/2005 | Yancey et al. | 709/238 |
| 2005/0259673 A1* | 11/2005 | Lu et al. | 370/419 |
| 2005/0262278 A1* | 11/2005 | Schmidt | 710/62 |
| 2006/0004643 A1* | 1/2006 | Stadelmann et al. | 705/34 |
| 2006/0166646 A1* | 7/2006 | Roach | 455/411 |
| 2006/0166647 A1* | 7/2006 | Roach | 455/411 |
| 2006/0166648 A1* | 7/2006 | Roach | 455/411 |
| 2006/0166649 A1* | 7/2006 | Roach | 455/411 |
| 2006/0166666 A1* | 7/2006 | Roach | 455/433 |
| 2006/0175417 A1* | 8/2006 | Ho | 235/492 |
| 2006/0202034 A1* | 9/2006 | Wallace et al. | 235/441 |
| 2006/0229090 A1* | 10/2006 | LaDue | 455/507 |
| 2007/0010285 A1* | 1/2007 | Schmidt | 455/553.1 |
| 2007/0015539 A1* | 1/2007 | Prise | 455/558 |
| 2007/0021149 A1* | 1/2007 | Abbassikhah | 455/558 |
| 2007/0060200 A1* | 3/2007 | Boris et al. | 455/558 |
| 2007/0074140 A1* | 3/2007 | Yancey et al. | 716/16 |
| 2007/0101242 A1* | 5/2007 | Yancey et al. | 714/776 |
| 2007/0111554 A1* | 5/2007 | Nishizaw et al. | 439/60 |
| 2007/0164118 A1* | 7/2007 | Degauque et al. | 235/492 |
| 2007/0165516 A1* | 7/2007 | Xu et al. | 370/217 |
| 2007/0170256 A1* | 7/2007 | Breitfuss | 235/451 |
| 2007/0170266 A1* | 7/2007 | Krygier et al. | 235/492 |
| 2007/0264997 A1* | 11/2007 | Chaudhary et al. | 455/426.1 |
| 2007/0268889 A1* | 11/2007 | Heutschi et al. | 370/352 |
| 2007/0276959 A1* | 11/2007 | Yancey et al. | 709/238 |
| 2008/0020756 A1* | 1/2008 | Jiang | 455/432.1 |
| 2008/0108347 A1* | 5/2008 | Jiang | 455/433 |
| 2008/0109331 A1* | 5/2008 | Stadelmann et al. | 705/34 |
| 2009/0043935 A1* | 2/2009 | Huomo et al. | 710/301 |

* cited by examiner

MULTIPLE PROCESSOR COMMUNICATION CIRCUIT CARDS AND COMMUNICATION DEVICES THAT EMPLOY SUCH CARDS

TECHNICAL FIELD

Embodiments of the invention relate generally to the field of data and/or voice communication, and more particularly to communication circuit cards and communication devices that employ such cards.

BACKGROUND

In the current state of wireless communication, communication devices such as cellular telephones may employ communication circuit cards. Examples of such cards include subscriber identity module (SIM) cards that may be inserted into a slot of a communication device such as a Global System for Mobile Communications (GSM) compliant wireless mobile telephone. Typically, a SIM card is employed to store various subscriber information including information and/or algorithms needed to authenticate a subscriber to a network, personal directories, personal settings, and so forth. Conventional SIM cards typically include a processor and various memories such as volatile, nonvolatile, and Electrically Erasable Programmable Read Only Memory (EEPROM) memories. The dimensions (i.e., form factor) of these SIM cards including the locations of the input/output (I/O) terminals or contacts, the signaling protocols, and so forth, are typically dictated by communication standards, such as those set forth by the International Organization for Standardization and the International ElectroTechnical Commission (ISO/IEC), the $3^{rd}$ Generation Partnership Project (3GPP), the GSM Consortium, and/or by other groups or agreements.

The term "wireless mobile phone" as used herein refers to the class of telephone devices equipped to enable a user to make and receive calls wirelessly, notwithstanding the user's movement, as long as the user is within the communication reach of a service or base station of a wireless network service provider. Unless specifically excluded, the term "wireless mobile phone" is to include the analog subclass as well as the digital subclass (of all signaling protocols).

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION OF ILLUSTRATIVE EMBODIMENTS

Illustrative embodiments of the present invention include communication circuit cards that employ at least two processors, or at least one processor and an attendant microcontroller, and communication devices that employ such cards, as well as methods for operating and communicating with such cards.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments" is used repeatedly. The phrase generally does not refer to the same embodiments; however, it may. The terms "comprising," "having," and "including" are synonymous, unless the context dictates otherwise.

Figure 1:
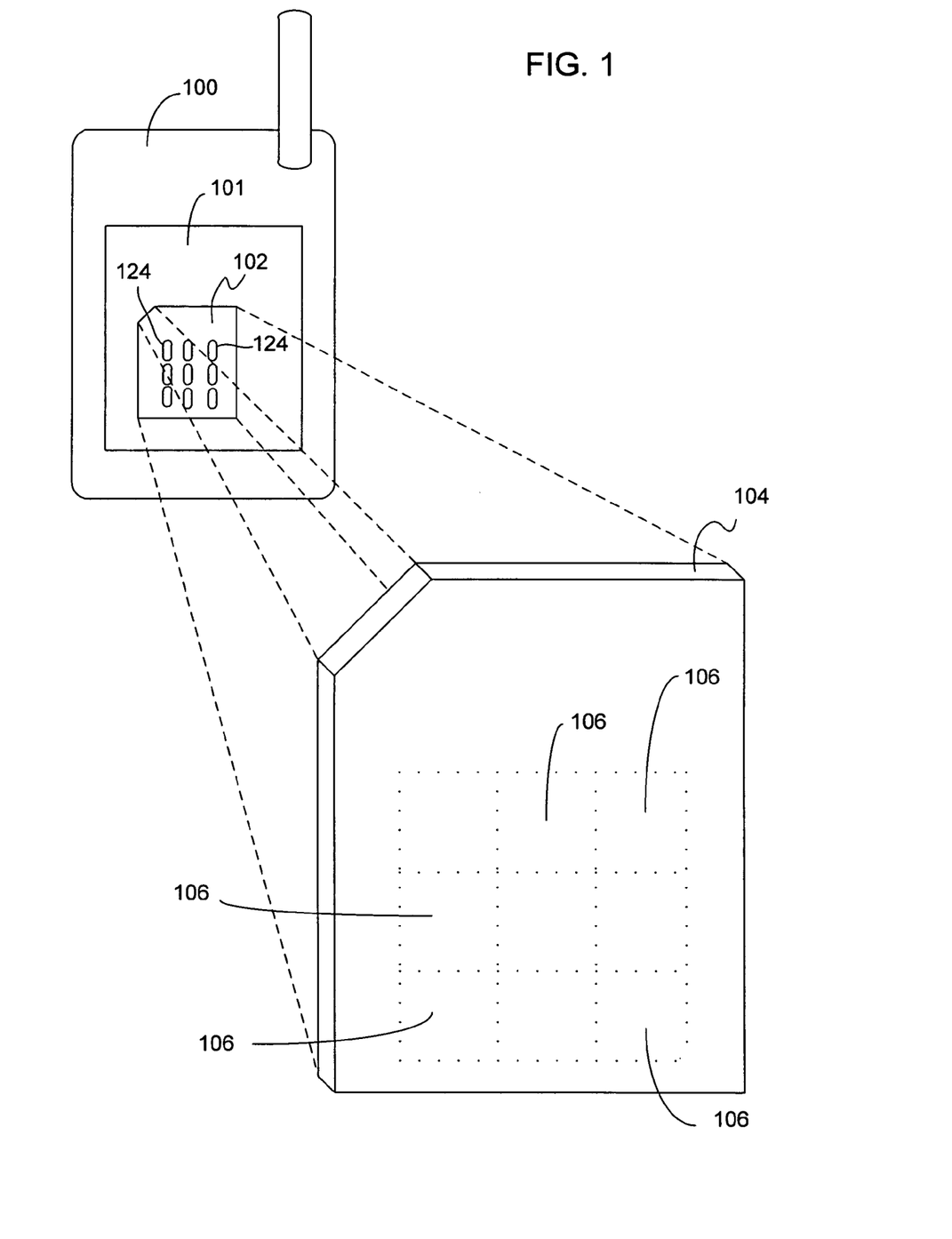
FIG. 1 illustrates a communication device and a multi-processor communication circuit card that fits into a slot of the communication device in accordance with various embodiments.

FIG. 1 depicts the backside of a communication device and a multi-processor communication circuit card that fits into a slot in the communication device in accordance with various embodiments. For the embodiments, the communication device 100 may be a wireless mobile phone (also referred to as cellular telephone) such as a GSM compliant cellular phone having a slot 102 disposed within a backside opening 101 and for receiving a multi-processor communication circuit card 104 (herein "circuit card 104") that includes at least two processors. The circuit card 104 may be a SIM card having a form factor complying with, for example, ISO/IEC, 3GPP, GSM consortium, or other standards. The circuit card 104 may include at least two processors (not depicted), a first and a second processor, and a plurality of I/O terminals 106 on the underside of the circuit card 104 as indicated by the dotted lines. Note, however, that in other embodiments, the circuit card 104 may include at least one processor and an attendant microcontroller. However, for ease of understanding, for the purpose of this application, the term "processor" shall be broadly construed to include controller, microcontroller and other elements of the like. The I/O terminals 106 make up the interface of the circuit card 104 that will couple with a core circuitry (not shown) of the communication device 100 via contacts 124. Although nine terminals 106 are depicted, in other embodiments, more or fewer terminals may be present in the circuit card 104. Further, while the circuit card 104 is depicted as engaging communication device 100 from its backside, in alternate embodiments, the circuit card 104 may engage with the communication device 100 via other locations.

In a conventional SIM card that is compliant with a communication standard such as ISO/IEC, 3GPP, GSM consortium, and/or other standards, only some of the I/O terminals of the conventional SIM card are currently being used while other terminals may be left unused. That is, used or dedicated terminals are terminals that are designated to be used for particular purposes specified by the standards. These include, for example, power, ground or reference, clock, input, and output signals. Unused or undedicated terminals are terminals that are not currently assigned for use in any particular way by the standards. It is contemplated, however, that in the future, more or all of the terminals of a SIM card may become used or dedicated terminals.

When the circuit card 104 is inserted into the slot 102 of the communication device 100, the I/O terminals or simply terminals 106 will couple with corresponding contacts 124 disposed in the slot 102. Each of the terminals 106 (as well as their corresponding contacts 124 on the communication device 100) may be dedicated or undedicated terminals in accordance with, for example, a communication standard (e.g., ISO/IEC, 3GPP, GSM consortium, or other standards). That is, in some embodiments, some of the terminals 106 and contacts 124 may be dedicated terminals and contacts while other terminals and contacts will be undedicated terminals and contacts. In other embodiments, however, all of the terminals 106 and contacts 124 may be dedicated terminals and contacts.

In brief, the communication device 100 may direct groups of signals to the circuit card 104 via one or more of the contacts 124 and one or more of the terminals 106. As the circuit card 104 receives the groups of signals, each group of signals is routed to either the first or the second processor integrated into the circuit card 104 depending upon whether the first or the second processor is to receive the group. Each group of signals may include signals such as one or more inputs, power, clock, and so forth. In some embodiments, each signal of a group of signals may be received by the circuit card 104 during the same time increment. That is, for these embodiments, the signals of a group of signals may be received via, for example, different terminals at the same moment of time or substantially within the same time period. In other embodiments, however, the signals of a group of signals may be received during different points of time.

Figure 2:
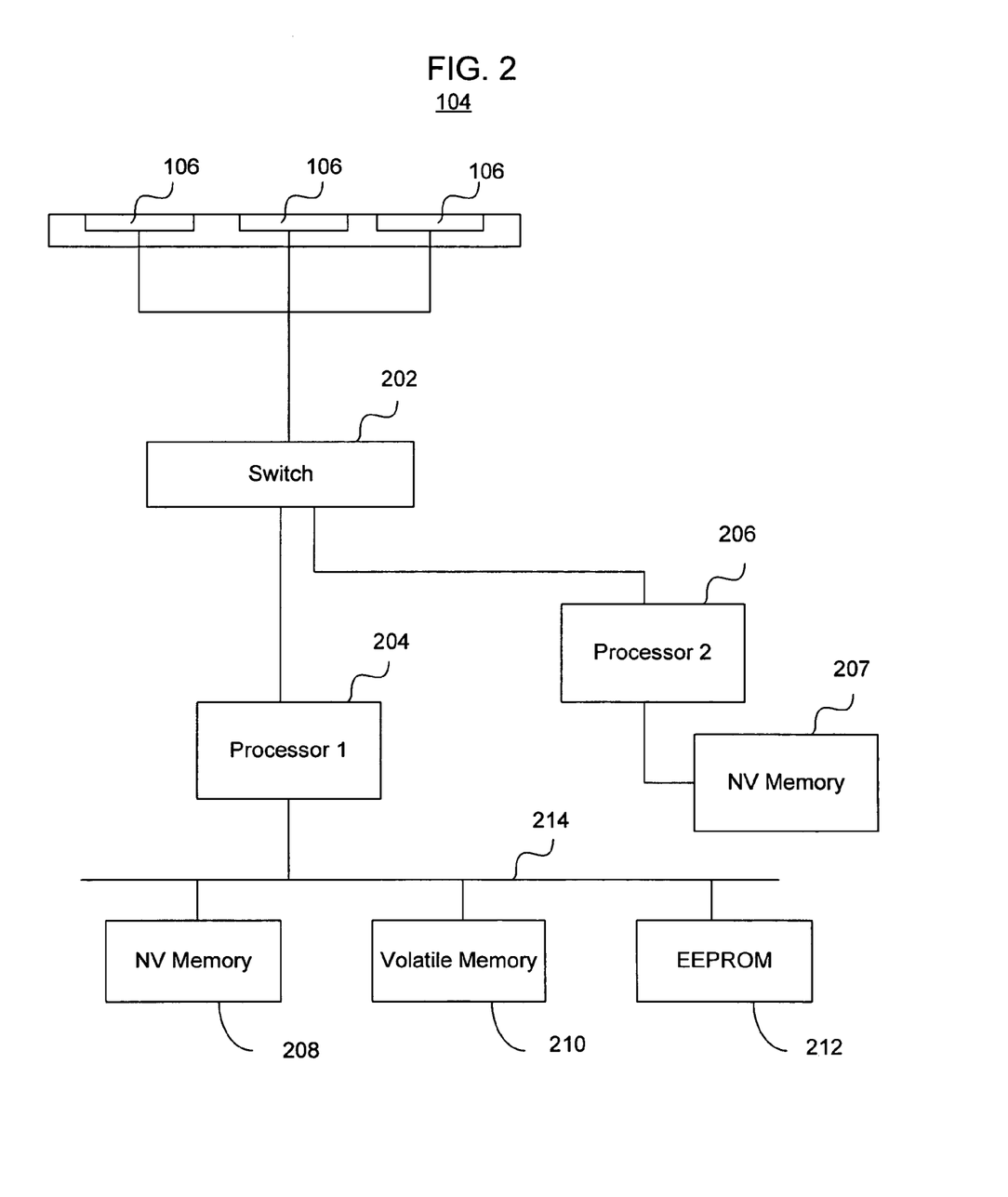
FIG. 2 illustrates a block diagram of a two-processor communication circuit card embodiment of the multi-processor circuit card of FIG. 1, in accordance with various embodiments.

FIG. 2 depicts a block diagram of a two-processor communication circuit card embodiment of the multi-processor circuit card 104 of FIG. 1, in accordance with various embodiments. The circuit card 104, which may be embodied in a substrate, may include a switch 202 that is coupled to a plurality of terminals 106, and to a first and second processor 204 and 206. The switch 202 may be any type of switching circuitry or any other type of device capable of selectively routing signals. The first processor 204 may be further coupled to a nonvolatile memory 208, volatile memory 210, and EEPROM 212, via bus 214. The second processor 206 may be further coupled to nonvolatile memory 207, which may include customize logic. The non-volatile memory 207 may include data and/or instructions designed to personalize, customize, and/or enhance functions of a communication device that receives the circuit card 104. Note that in alternative embodiments, the second processor 206 may be coupled to various other components such as volatile memory and/or EEPROM. In still other embodiments, the first and second processor 204 and 206 may be coupled to one or more common components (e.g., nonvolatile memory 208, volatile memory 210 and EEPROM 212). In still other embodiments, additional components such as additional processors may be included in the circuit card 104. In yet other embodiments, the second processor 206 may be replaced with an attendant microprocessor.

The first processor 204 may be a microprocessor such as those found in conventional single-processor SIM cards. In various embodiments, the first processor 204 may be adapted to implement or execute communication functions in accordance with a communication standard. These functions may include functions that may be typically performed by a processor of a conventional SIM card such as retrieving or storing subscriber information and retrieving personal telephone numbers. The communication standard, may be any communication standard (e.g., ISO/IEC, 3GPP, GSM consortium, or any other standard).

In contrast, the second processor 206 may be adapted to at least implement functions beyond communications functions specified by the communication standard of the first processor 204. That is, the second processor 206 may perform functions that may not be typically performed by, for example, a conventional SIM card processor that performs communications functions in accordance with a communication standard. In some embodiments, when the circuit card 104 is coupled to a communication device 100, the second processor 206 may increase the processing power of the communication device 100, personalize and/or customize communication device 100, or provide enhanced functions to communication device 100.

In various embodiments, the switch 202 may be adapted to facilitate selective routing of signals received through one or more of the terminals 106 to either the first processor 204 or the second processor 206. Note that the term "signals," as used herein, is broadly defined and may mean a variety of signals including, for example, input signals, clock, power, and so forth. For the embodiments, the signals that are received may be grouped into groups of signals, each group directed to either the first or the second processors 204 and 206. In order to properly channel each group of signals to the proper circuit card processor (e.g., first or second processor 204 and 206), the switch 202 may route each group of signals based on the logic endowed with the switch 202. The term "group of signals" as used herein may refer to a single signal or a plurality of signals. Further note that the phrases "groups of signals" and "signal groups" are synonymous.

The switch logic may be integrated into the switch 202 or may be stored in nonvolatile memory such as flash memory that may be coupled to the switch 202. At least two types of signal groups may be received through one or more terminals 106. Those signal groups that are to be processed by the first processor 204 and those signal groups that are to be processed by the second processor 206. The switch 202 may route a group of signals received through the terminals 106 based on various criteria. Various routing logic may be employed to properly route groups of signals to the proper processor (i.e., the first or the second processor 204 or 206). The use of a particular routing logic for routing groups of signals may depend on, in some circumstances, whether many, few, or no terminals are undedicated (i.e., unused) terminals, and if none of the terminals 106 are undedicated terminals, whether few or many signal patterns are undefined. In brief, unique signal patterns may form when one or more signals of a group of signals arrive at selected terminals during an increment of time or session. The formation of unique signal patterns may occur even when all of the terminals are dedicated terminals. The various routing logic used for properly routing groups of signals to the first or the second processor 204 or 206 will be described in greater detail below. Note that although the various routing logic described below are described as they relate to specific circumstances, those skilled in the art will recognize that they may be applied in other circumstances.

In various embodiments, when a group of signals is initially received through one or more of the terminals 106, the switch 202 may be adapted to initially make a determination whether the entire group of signals is received either through a first or a second type of one or more terminals 106. Based on this determination, the switch 202 may route the group of signals to either the first or the second processor 204 and 206. For the embodiments, the first type of one or more terminals may be dedicated or used terminal(s) in accordance with, for example, a communication standard (e.g., ISO/IEC, 3GPP, GSM consortium, or other standards), while the second type of one or more terminals may be undedicated or unused terminal(s) in accordance with, for example, the communication standard. If an entire group of signals is received through the first type of one or more terminals, then the switch 202 may direct the group of signals to the first processor 204. On the other hand, if the entire group of signals is received through the second type of one or more terminals then the switch 202 may direct the group of signals to the second processor 206.

In other embodiments, the switch 202 may be adapted to make a determination whether at least one signal from the group of signals is received through the second type of one or more terminals (e.g., undedicated terminals). If at least one signal from the group of signals is received through the second type of one or more terminals, then the switch 202 may route the entire group of signals to the second processor 206. If, on the other hand, no signals from the group of signals are received through the second type of one or more terminals, then the switch 202 may route the entire group of signals to the first processor 204.

In still other embodiments in which, for example, all or substantially all terminals 106 are used by the communication standard, and sufficient combinations of the terminals 106 remain undefined by the communication standard, and are available to form an augmenting communication protocol for the communication device 100 to communicate with the second processor 206, one or more of the signals from the group of signals may include one or more corresponding identifier tags (defined by particular combinations of the terminals 106) to denote communication with the second processor 206. For these embodiments, the switch 202 may be adapted to examine the signal pattern of a group of signals depicted by the relevant combinations of terminals that the one or more signals of the group of signals are received through, and the identifier tag or tags included with the one or more signals, to determine whether the received group of signals is to be routed to the second processor 206.

In various embodiments, one or more undefined signal patterns may be associated with a group of signals received through the terminals 106 even in situations whereby all of the terminals 106 are dedicated terminals. This is because, although all of the terminals 106 may be dedicated, not all of the terminals 106 will actually be used at all times. For example, by employing headers, incorporated with identifier tag or tags into, unique signaling patterns may be depicted. These unique signaling patterns may designate that a group of signals is to be routed to the first processor 204 or to the second processor 206.

Based on the determination, the switch 202 may route the group of signals to either the first or the second processor 204 or 206. In some embodiments, if the signals of a group of signals include data packets, then the identifier tags may be included in the header of the data packets.

In still other embodiments in which, for example, all or substantially all of the terminals 106 are used by the communication standard, and insufficient combinations of terminals 106 remain undefined by the communication standard for use to form an augmenting communication protocol for communication device 100 to communicate with second processor 206, two combinations of signals at one or more terminals 106 may define a first and a second signal pattern to denote a start and an end of communication session with second processor 206. In other words, the switch 202 is adapted to route all signals to second processor 206 after receiving signals at the particular combination of terminals 106 denoting the beginning of a communication session with second processor 206, until after receiving signals at the same or other particular combination of terminals 106 denoting the end of a communication session. Switch 202 routes received signals to first processor 204 in all other times.

Figure 3:
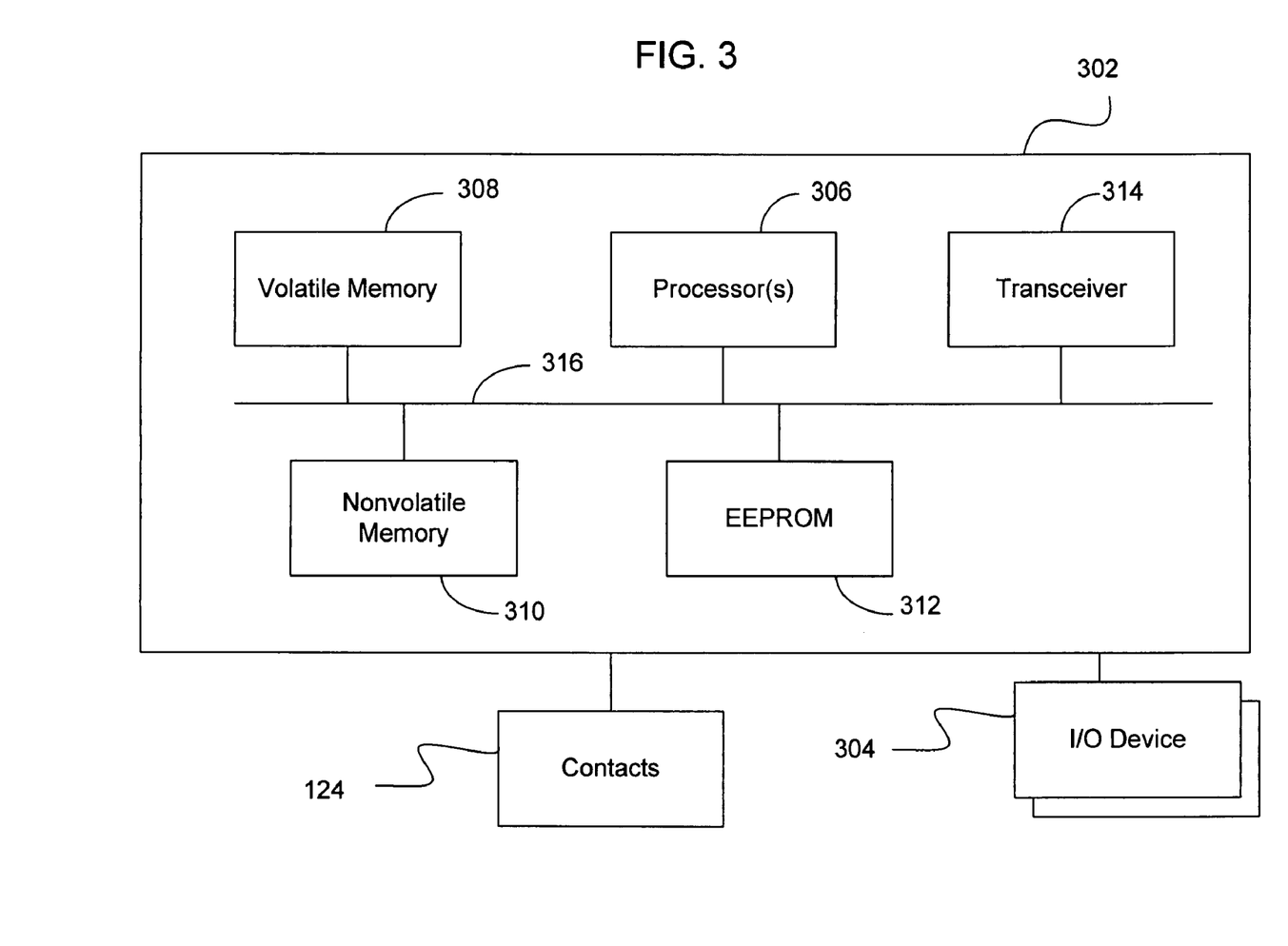
FIG. 3 illustrates a block diagram of the communication device of FIG. 1, in further detail, in accordance with various embodiments.

FIG. 3 depicts a block diagram of the communication device 100 of FIG. 1, in further detail, in accordance with some embodiments. For the embodiments, the communication device 100 may include core circuitry 302 that is coupled to an antenna (not shown), I/O devices 304, and contacts 124. The I/O devices 304 may be, for example, a key pad, display, and so forth. The core circuitry 302 may include processor(s) 306 including a digital signal processor (DSP), volatile memory 308, nonvolatile memory 310, EEPROM 312, transceiver 314, and bus 316. The core circuitry 302 may be adapted to selectively direct and/or receive signals to and from one or more of the contacts 124. Note that although specific components are depicted as being included in the core circuitry 302, in another embodiments, one or more of the components depicted may be absent. Further, additional components not depicted may be included in the core circuitry 302. Further still, one or more of the core circuitry components depicted may be replaced with alternative equivalent or nonequivalent components.

In various embodiments, the core circuitry 302 may be adapted to direct groups of signals to the contacts 124 or receive groups of signals from the contacts 124. The groups of signals to be directed may be groups of signals received through the transceiver 314 or may be internally generated by the communication device as a result of, for example, input from a user or internally generated by, for example, the processor(s) 306. In some embodiments, the core circuitry 302 may be adapted to direct or receive one or more signals of a group of signals, or both, to and from selective contacts in order to facilitate the directing or receiving groups of signals to and from a first processor 204 or a second processor 206 of a circuit card 104. In various embodiments, the core circuitry 302 is adapted to determine whether a received circuit card 104 has a second processor 206 in addition to the first processor 204 of the circuit card 104.

In various embodiments, the core circuitry 302 may be adapted to selectively communicate with the first and second processors 204 and 206 of a received circuit card 104 by selectively directing signals to or receiving signals from I/O terminals 106 that are used or unused by a communication standard, on determining whether a circuit card 104 inserted into the slot 102 of the communication device 100 has a second processor 206. If it is determined that the inserted circuit card 104 does not include a second processor 206, the core circuitry 302 may communicate with the circuit card 104 in a, for example, conventional manner.

In yet other embodiments, as described earlier in which, for example, all or substantially all terminals 106 are used by the communication standard, and sufficient combinations of the terminals 106 remain undefined, and are available for defining an augmenting communication protocol, the core circuitry 302, on determining the presence of second processor 206, may direct signals to the second processor 206 by including in a subsets of signals identifier tags (defined by certain otherwise undefined combinations of terminals 106). Similarly, core circuitry 302 may be further adapted to recognize received signals as having been sent by second processor 206 by detecting for presence of the identifier tags (defined by certain otherwise undefined combinations of terminals 106).

In yet other embodiments, as described earlier in which, for example, all or substantially all terminals 106 are used by the communication standard, and insufficient combinations of the terminals 106 remain undefined for defining an augmenting communication protocol, the core circuitry 302 may be adapted to direct or receive signals to the second processor 206 after first directing signals to, or receiving signals from a combination of terminals 106 denoting the start of a communication session with the second processor 206, on determining the presence of second processor 206 in the received circuit card 104. The core circuitry 302 would be further adapted to direct signals to, or receive signals from the same or another combination of terminals 106 denoting the end of a communication session with the second processor 206.

Accordingly, multi-processor communication circuit cards and communication devices that employ such cards have been described in terms of the above-illustrated embodiments. It will be appreciated by those of ordinary skill in the art that a wide variety of alternate and/or equivalent implementations calculated to achieve the same purposes may be substituted for the specific embodiments shown and described without departing from the scope of the present invention. Those of ordinary skill in the art will readily appreciate that the present invention may be implemented in a very wide variety of embodiments. This description therefore is intended to be regarded as illustrative instead of restrictive on embodiments of the present invention.

What is claimed is:

1. A circuit card, comprising:
   a substrate;
   an interface disposed on the substrate having a plurality of input/output (I/O) terminals;
   a first processor disposed on the substrate and adapted to implement communication functions in accordance with a communication standard;
   a second processor disposed on the substrate and adapted to implement additional functions beyond said communication functions specified by the communication standard; and
   a switch disposed on the substrate and coupled to the interface, the first processor, and the second processor, and configured to selectively route a group of signals between the I/O terminals and the first and second processors, the group of signals comprising a plurality of signals received through a selected combination of the I/O terminals, wherein said switch is further configured to recognize a signal pattern depicted by said selected combination of the I/O terminals through which the group of signals was received, the combination being undefined by the communication standard, and to determine said routing of the group of signals to either the first processor or the second processor based at least in part on said signal pattern.

2. The circuit card of claim 1, wherein the first processor is adapted to implement communication functions in accordance with a standard selected from the group consisting of International Organization for Standardization and the International ElectroTechnical Commission (ISO/IEC) standard, 3rd Generation Partnership Project (3GPP) standard, and GSM Consortium standard, and the second processor is adapted to implement the additional functions beyond the standard of the first processor.

3. The circuit card of claim 1, wherein the switch is further adapted to route the group of signals to the first processor if the signals are received exclusively through the I/O terminals used by the communication standard, and route the group of signals to the second processor if one or more of the signals are received through a group of I/O terminals that includes at least I/O terminals unused by the communication standard.

4. The circuit card of claim 1, wherein said switch is adapted to route the group of signals to the second processor if the signals received through the I/O terminals include the signal pattern denoted by the subset of the receiving I/O terminals.

5. The circuit card of claim 1, wherein said switch is adapted to determine said routing based at least in part on whether the signals are received through the selected combination of I/O terminals after receipt of a first signal pattern, but before receipt of a second signal pattern, the switch being further adapted to recognize the first and second signal patterns.

6. The circuit card of claim 5, wherein said switch is adapted to route the group of signals to the second processor if the signals are received through the selected combination of I/O terminals after receipt of the first signal pattern but before receipt of the second signal pattern.

7. The circuit card of claim 1, wherein the circuit card further comprises a non-volatile memory coupled to the second processor, having data and/or instructions designed to personalize, customize, and/or enhance functions of a communication device receiving the circuit card.

8. The circuit card of claim 1, wherein the substrate is adapted with a form factor in accordance with the communication standard.

9. The circuit card of claim 1, wherein the circuit card is adapted to receive at least a first signal for implementation of the communication function and at least a second signal for the additional functions through at least one I/O terminal used by the communication protocol and through at least one I/O terminal unused by the communication protocol, respectively, at the same moment of time.

10. A method, comprising:
    receiving a group of signals through selected ones of a plurality of input/output (I/O) terminals of a circuit card;
    determining, by a switch coupled to the circuit card and to the plurality of I/O terminals, whether to route the group of signals to a first processor of the circuit card adapted to implement communication functions in accordance with a communication standard or to a second processor of the circuit card adapted to implement additional functions beyond said communication functions specified by the communication standard, said determining based at least in part on whether the group of signals is received through a selected combination of the I/O terminals, the selected combination depicting a signal pattern of the group of signals and the selected combination being undefined by the communication standard, wherein the switch is further adapted to recognize the signal pattern depicted by the combination; and
    selectively routing the group of signals by the switch to either the first or the second processor based at least in part on the signal pattern depicted by the selected combination.

11. The method of claim 10, wherein said routing comprises routing the signals either to a first processor adapted to implement communication functions in accordance with a standard selected from the group consisting of International Organization for Standardization and the International ElectroTechnical Commission (ISO/IEC) standard, 3rd Generation Partnership Project (3GPP) standard, and GSM Consortium standard, or to a second processor adapted to implement the additional functions beyond the standard of the first processor.

12. The method of claim 10, wherein said routing comprises routing the group of signals to the first processor if the signals are received exclusively through the I/O terminals used by the communication standard, and routing the group of signals to the second processor if one or more of the signals are received through a group of I/O terminals that includes at least I/O terminals unused by the communication standard.

13. The method of claim 10, wherein said switch routes the group of signals to the second processor if the signals are received through a subset of I/O terminals that denote a signal pattern unused by the communication standard, wherein said subset includes at least one I/O terminal used by the communication standard.

14. The method of claim 10, wherein said switch determining said routing based at least in part on whether the signals are received through the I/O terminals after receipt of a first signal pattern, but before receipt of a second signal pattern, the switch being further adapted to recognize the first and second signal pattern.

15. The method of claim 14, wherein said switch routing the received signals to the second processor if the signals are received after receipt of the first signal pattern but before receipt of the second signal pattern.

16. A communication device, comprising:
a slot adapted to receive a circuit card, the slot including a plurality of contacts; and
circuitry coupled to the plurality of contacts and adapted to direct or receive a group of signals, or to both direct and receive a group of signals, to and from selected ones of the plurality of contacts, said group of signals comprising a plurality of signals;
wherein the plurality of contacts adapted to correspondingly couple with a plurality of input/output (I/O) terminals of the received circuit card;
wherein the circuitry selectively communicates with a first processor of the received circuit card adapted to implement communication functions in accordance with a communication standard, and selectively communicates with a second processor of the received circuit card adapted to implement additional functions beyond the communication functions specified by the communication standard, by directing or receiving the group of signals through the contacts corresponding to a selected combination of I/O terminals, the selected combination being undefined by the communication standard, wherein the circuitry is configured to recognize a signal pattern depicted by said selected combination, and wherein the circuitry is configured to selectively communicate with either the first processor or the second processor based at least in part on said signal pattern.

17. The communication device of claim 16, wherein said circuitry is further adapted to determine whether the received circuit card comprises the second processor in addition to the first processor.

18. The communication device of claim 16, wherein said circuitry is adapted to direct or receive signals, or both, to and from the first processor of the received circuit card to implement communication functions in accordance with a standard selected from the group consisting of International Organization for Standardization and the International ElectroTechnical Commission (ISO/IEC) standard, 3rd Generation Partnership Project (3GPP) standard, and GSM Consortium standard, and to direct or receive signals, or both, to and from the second processor of the received circuit card to implement functions beyond the communication functions specified by the standard of the first processor.

19. The communication device of claim 16, wherein said circuitry is further adapted to direct signals to the second processor of the received circuit card, by directing signals to selected ones of the contacts, including directing signals to a subset of the contacts corresponding to said I/O terminals depicting the signal pattern, the signal pattern denoting to the received circuit card to route the signals to the second processor of the received circuit card.

20. The communication device of claim 16, wherein said circuitry is further adapted to determine whether signals received from the received circuit card is received from the second processor of the received circuit card by determining whether the received signals includes signals received through a subset of the contacts corresponding to the I/O terminals depicting the signal pattern.

21. The communication device of claim 16, wherein said circuitry is further adapted to direct signals to the second processor of the received circuit card, by first directing signals to selected one(s) of the contacts to depict a first signal pattern, and terminate said directing of signals to the second processor of the received circuit card by directing signals to selected one(s) of the contacts to depict a second signal pattern.

22. The communication device of claim 16, wherein said circuitry is further adapted to determine whether signals received from the received circuit card are received from the second processor of the received circuit card, by determining whether the received signals denotes a first or a second signal pattern, the first signal pattern denoting signals following the first signal pattern are from the second processor of the received circuit card, and the second signal pattern denoting end of signals from the second processor of the received circuit card.

23. The communication device of claim 16, wherein said additional functions comprise personalization, customization, and/or enhanced functions of the communication device.

24. The communication device of claim 16, wherein the communication device comprises a wireless mobile phone.

25. The communication device of claim 16, wherein the circuitry is adapted to direct or receive at least a first signal for implementation of the communication function and at least a second signal for the additional functions through at least one I/O terminal used by the communication protocol and through at least one I/O terminal unused by the communication protocol, respectively, at the same moment of time.

26. A method, comprising:
receiving a circuit card in a slot of a communication device, the slot including a plurality of contacts; and
directing or receiving signals, or both, to and from selected ones of the plurality of contacts, by a circuitry coupled to the plurality of contacts;
wherein the plurality of contacts is adapted to correspondingly couple with a plurality of input/output (I/O) terminals of the received circuit card;
wherein the directing or receiving includes selectively communicating with a first processor of the received circuit card adapted to implement communication functions in accordance with a communication standard, and with a second processor of the received circuit card adapted to implement additional functions beyond the communication functions specified by the communication standard, by directing or receiving signals through the contacts corresponding to a selected combination of the I/O terminals receiving the signals, said I/O terminals receiving the signals being a subset of the I/O terminals of the circuit card, based on signal patterns depicted by said selected combination, the I/O terminals being dedicated terminals used by the communication standard and selected combination being undefined by the communication standard, and wherein the selectively communicating with the second processor is based at least in part on said signal patterns.

27. The method of claim 26, wherein said circuitry further determining whether the received circuit card comprises the second processor in addition to the first processor.

28. The method of claim 26, wherein said circuitry directing or receiving signals, or both, to and from the first processor of the received circuit card to implement communication functions in accordance with a standard selected from the group consisting of International Organization for Standardization and the International ElectroTechnical Commission (ISO/IEC) standard, 3rd Generation Partnership Project (3GPP) standard, and GSM Consortium standard, and to directing or receiving signals, or both, to and from the second processor of the received circuit card to implement functions beyond the communication functions specified by the standard of the first processor.

29. The method of claim 26, wherein said circuitry directing signals to the second processor of the received circuit card, by directing signals to selected ones of the contacts, including directing signals to a subset of the contacts depicting the signal pattern, the signal pattern denoting to the received circuit card to route the signals to the second processor of the received circuit card.

30. The method of claim 26, wherein said circuitry determining whether signals received from the received circuit card is received from the second processor of the received circuit card by determining whether the received signals includes signals received through a subset of the contacts depicting the signal pattern.

31. The method of claim 26, wherein said circuitry directing signals to the second processor of the received circuit card, by first directing signals to selected one(s) of the contacts to depict a first signal pattern, and terminate said directing of signals to the second processor of the received circuit card by directing signals to selected one(s) of the contacts to depict a second signal pattern.

32. The communication device of claim 26, wherein said circuitry determining whether signals received from the received circuit card are received from the second processor of the received circuit card, by determining whether the received signals denotes a first or a second signal pattern, the first signal pattern denoting signals following the first signal pattern are from the second processor of the received circuit card, and the second signal pattern denoting end of signals from the second processor of the received circuit card.

* * * * *